(12) United States Patent
Burch et al.

(10) Patent No.: US 6,314,943 B1
(45) Date of Patent: Nov. 13, 2001

(54) FUEL SUPPLY RAIL WITH INTEGRATED FUEL INJECTOR LOAD SPRING

(75) Inventors: Craig Edward Burch, West Bloomfield; Dale Mathew Mayol, Belleville, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/425,508

(22) Filed: Oct. 22, 1999

(51) Int. Cl.[7] .................................................. F02M 37/04
(52) U.S. Cl. ............................................. 123/470; 123/456
(58) Field of Search ..................................... 123/509, 470, 123/468, 456, 469

(56) References Cited

U.S. PATENT DOCUMENTS

| | | |
|---|---|---|
| 2,166,331 | * 7/1939 | Waeber .............................. 123/470 |
| 3,038,456 | 6/1962 | Dreisin ................................ 123/32 |
| 4,066,213 | 1/1978 | Stampe ............................ 239/533.3 |
| 4,528,959 | * 7/1985 | Hauser, Jr. ......................... 123/470 |
| 4,567,872 | * 2/1986 | Roosa ................................. 123/470 |
| 4,901,700 | * 2/1990 | Knight et al. ...................... 123/470 |
| 5,121,731 | * 6/1992 | Jones .................................. 123/470 |
| 5,247,918 | * 9/1993 | Wakeman ........................... 123/470 |
| 5,697,345 | 12/1997 | Genter et al. ...................... 123/470 |
| 5,752,487 | * 5/1998 | Harrell et al. ...................... 123/470 |
| 5,785,024 | 7/1998 | Takei et al. ........................ 123/470 |
| 5,806,494 | 9/1998 | Glassey .............................. 123/456 |
| 6,062,200 | * 5/2000 | Hofmeister ........................ 123/470 |
| 6,102,007 | * 8/2000 | Furst .................................. 123/469 |

* cited by examiner

Primary Examiner—Carl S. Miller

(57) ABSTRACT

A fuel supply rail assembly (30) includes a plurality of fuel injector-receiving housings (34) for mounting on a cylinder head (12) of an internal combustion engine and a plurality of fuel injector load springs (50) with each spring disposed in each fuel rail housing (34) in a manner to bias a fuel injector received therein within a preselected injector load tolerance range relative to the cylinder head (12).

9 Claims, 1 Drawing Sheet

FUEL SUPPLY RAIL WITH INTEGRATED FUEL INJECTOR LOAD SPRING

BACKGROUND OF THE INVENTION

1. Field of the Invention

The present invention relates to a fuel supply rail for a fuel injector in a cylinder head of an internal combustion engine.

2. Description of Related Art

Internal combustion engines with direct injection spark ignition require fuel to be injected into the engine combustion chambers by respective fuel injectors mounted on the water cooled engine cylinder head. Each fuel injector is provided with an injector seat that engages a seat on the cylinder head to provide a heat transfer path to the cylinder head in order to provide cooling of the fuel injector in use on the engine. Since thermal expansion rates are different between a typical aluminum alloy cylinder head and a stainless steel fuel injector housing, a cantilever spring clip separate from the fuel injector has been used in the past to retain and load or bias each fuel injector relative to the cylinder head seat prior to assembly of the fuel rail that supplies fuel to the fuel injectors. Use and assembly of such separate cantilever spring clips in this manner is disadvantageous in that the numerous separate cantilever clips complicate assembly of the fuel injectors as well as servicing of the fuel injection system on the vehicle and provides a fuel injector load tolerance range relative to the cylinder head that can be excessive or deficient as a result of part dimensional tolerance range and thermal expansion effects.

An object of the present invention is to provide an improved fuel injector system having a fuel supply rail assembly with an integrated fuel injector load spring that overcomes the above discussed disadvantages.

SUMMARY OF THE INVENTION

The present invention provides a fuel injector system including a fuel supply rail assembly having a plurality of fuel injector-receiving housings for mounting on the cylinder head of an internal combustion engine and a fuel injector load spring integrated in each fuel rail housing in a manner to bias a fuel injector received in each housing within a preselected injector load tolerance range relative to the cylinder head. To this end, each fuel injector load spring is disposed inside each fuel rail housing between the fuel rail housing and a respective fuel injector received therein. The fuel injector load spring integrated in the fuel supply rail in this manner maintains a minimum fuel injector load relative to the cylinder head to provide a satisfactory heat transfer path to the cylinder head and limits maximum fuel injector loading. Integration of the fuel injector load spring in the fuel supply rail simplifies assembly of the fuel injector system as well as servicing thereof and provides more accurate control of the fuel injector load tolerance range.

The above objects and advantages of the present invention will become more readily apparent from the following description taken with the following drawings.

DETAILED DESCRIPTION OF THE PREFERRED EMBODIMENT

Figure 1:
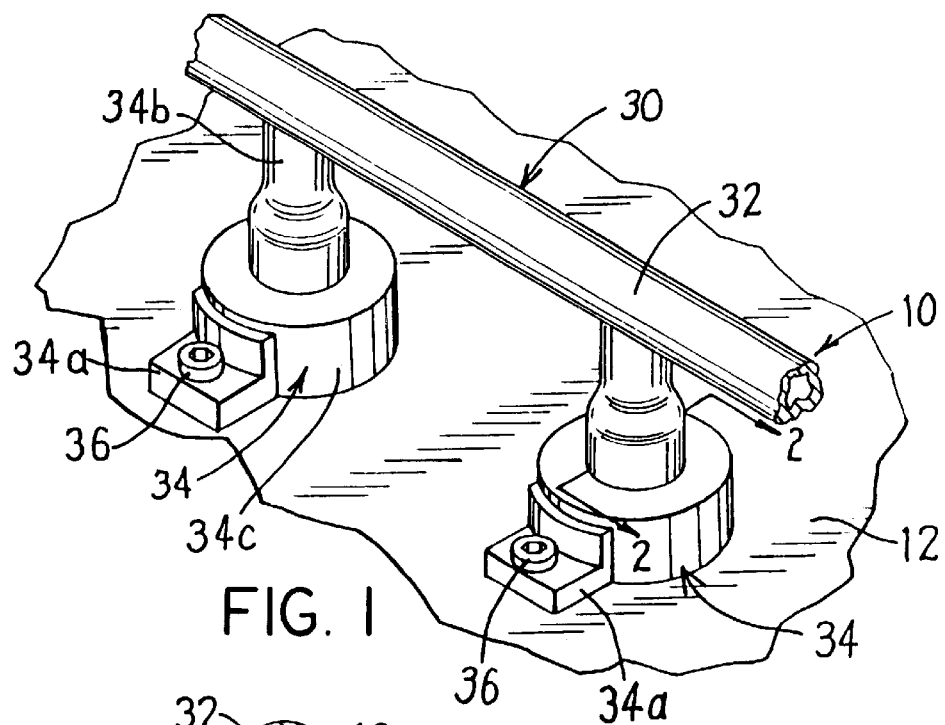
FIG. 1 is a perspective view of a fuel supply rail assembly pursuant to an embodiment of the invention having a plurality of fuel rail housings fastened on a cylinder head of an internal combustion engine.

The present invention provides a fuel injector system 10 for use on a conventional cylinder head 12 of an internal combustion engine wherein the cylinder head 12 together with the engine block (not shown) defines a plurality of combustion chambers 14 (one shown) for direct fuel injection spark ignition in conventional manner. The cylinder head 12 includes internal water cooling passages 12a in conventional manner through which a water/antifreeze solution is circulated. The cylinder head 12 is formed to include a plurality of fuel injector passages 13 with each passage 13 communicated to a respective combustion chamber 14. Each passage 13 is adapted to receive a high pressure gasoline fuel injector 20, FIG. 2, such that fuel can be injected directly into the combustion chambers and ignited with air therein by a spark plug (not shown) in each combustion chamber.

Each fuel injector 20 can comprise any high pressure gasoline direct injector having an injector body 22 with a fuel inlet end 22a and fuel discharge end 22b received in a relatively small diameter section 13a of each cylinder head passage 13 for directly injecting the fuel into the combustion chamber 14 with which it is communicated and having a conical injector seat 22c that directly contacts a respective conical seat 15 of the cylinder head 12 to provide a heat transfer from the injector body 22 to the water cooled cylinder head 12, whereby the fuel injectors 20 are cooled during engine operation. An annular Teflon or other seal 24 is disposed on the discharge end 22b of each fuel injector to seal combustion gases from entering the injector pocket or passage 13.

Figure 2:
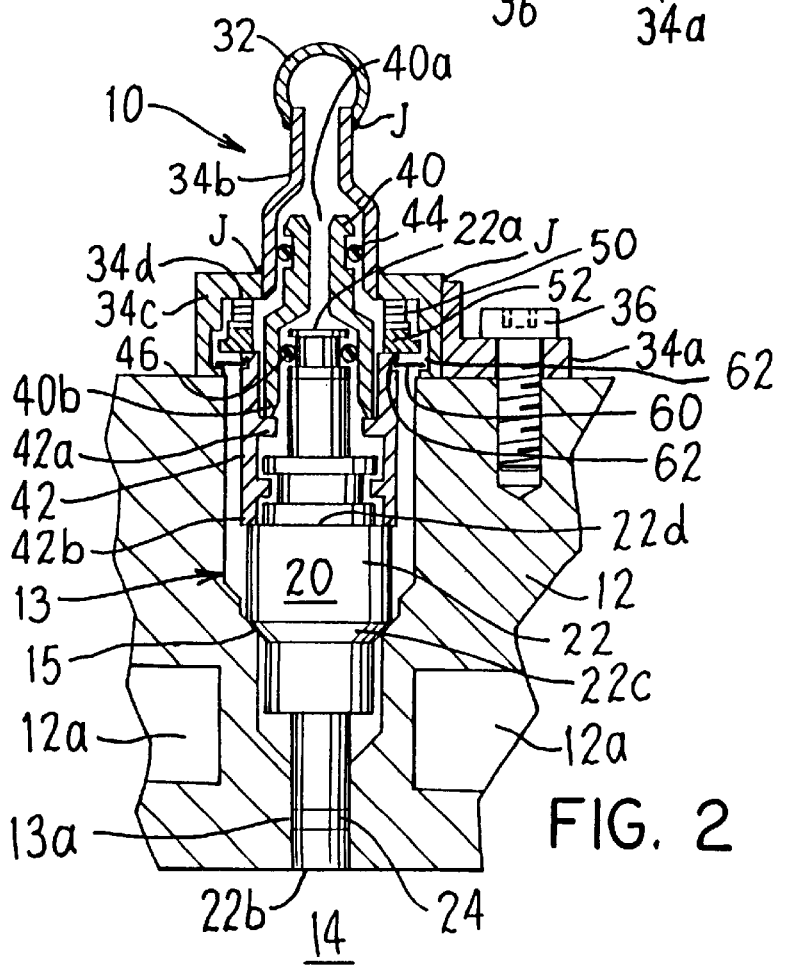
FIG. 2 is a cross-sectional view of the fuel supply rail housing of FIG. 1 taken along lines 2—2 showing a fuel injector load spring integrated in the fuel rail housing for biasing a fuel injector therein against a cylinder head seat.

A fuel supply rail assembly 30 pursuant to an embodiment of the present invention includes a fuel supply tube 32 communicated to a high pressure fuel pump (not shown) disposed on the cylinder head 12 and a plurality of fuel injector-receiving housings 34 in which a respective fuel injector 20 and respective fuel injector load spring 50 are received, FIG. 2. The fuel rail housings 34 are mounted on the cylinder head 12 by flanges 34a and associated mounting fasteners (e.g. bolts) 36. Each fuel rail housing 34 comprise a housing neck 34b and housing cylindrical body 34c that are brazed together at braze joints J such that fuel can flow from the fuel supply tube 32 to the housings 34. The aforementioned flange 34a also is brazed to a respective housing body 34c at braze joint J.

Each fuel injector 20 is mounted in a respective cylinder head passage 13 by a first (e.g. upper) tubular retainer sleeve 40 and second (e.g. lower) retainer sleeve 42. The first retainer sleeve 40 is fluid tight sealed exteriorly to the housing neck 34b and interiorly about the inlet end 22a of the fuel injector body 22 by respective O-ring seals 44, 46. High pressure fuel is received from the fuel rail supply tube 32 and housings 34 by the respective fuel injector inlet ends 22a for discharge from their discharge ends 22b into the combustion chambers 14. The first retainer sleeve 40 includes a fuel inlet 40a and annular end 40b that rests on annular inner shoulder 42a of the second retainer sleeve 42. The second sleeve 42 in turn includes an annular end 42b that rests on annular shoulder 22d of the injector body 22 such that the retainer sleeves 40, 42 can float or move axially in the passage 13 to accommodate thermal expansion effects and dimensional tolerances of the various components of the fuel rail assembly.

The aforementioned fuel injector load spring 50, FIG. 2, is integrated in fuel supply rail 34 pursuant to the present invention by being positioned to reside interiorly in each fuel rail housing 34 between the housing body 34c and the associated retainer sleeve 42 in a manner to bias the seat 22c of each fuel injector 20 within a preselected injector load tolerance range relative to cylinder head seat 15 to provide a minimum fuel injector load to provide a minimum injector load on cylinder head seat 15 to provide a heat transfer cooling path to the cylinder head 12 and to limit maximum injector loading during service on the internal combustion engine.

For purposes of illustration and not limitation, the fuel injector load spring 50 is shown comprising a plurality of annular Belleville springs (e.g. 3–4 springs) disposed one atop the other between the end wall 34d of the housing body 34c and annular load transfer collar 52 disposed on annular upper end of the second retainer sleeve 42. The Belleville springs 50 each have a truncated conical cross section with the inner diameter being elevated relative to the outer diameter when the spring is positioned on a horizontal flat surface. The spring force of the Belleville spring is transferred to the fuel injector 20 by the load transfer collar 52 and the second retainer sleeve 42 to bias the fuel injector seat 22c on the cylinder head seat 15 within the preselected injector load tolerance range. The Belleville springs 50 provide a compact spring assembly with a wide spring load range for small spring deflection. However, the invention is not so limited and can be practiced using other types of springs 50 inside the fuel rail housings 34 to bias the fuel injector seat 22c against the cylinder head seat 15 within the preselected injector load tolerance range.

Integration of the fuel injector load springs 50 in the fuel supply rail assembly 30 in the manner described simplifies assembly of the fuel injector system as well as servicing of the fuel injection system. In particular, the fuel supply rail assembly 30 is assembled by inserting the retainer sleeves 40, 42 and fuel injectors 20 in the fuel rail housings 34 and then fastening the fuel supply rail assembly 30 on the cylinder head 12 using fasteners 36 with the discharge ends 22b of the fuel injectors 20 received in the cylinder head passages 13a, FIG. 2. Only fasteners 36 are needed at the fuel rail housings 34 to attach the fuel supply rail assembly 30 to the cylinder head 12. No additional fasteners, nuts, or cantilever spring clips are needed for fastening the fuel injectors to the fuel supply rail assembly or the cylinder head. Moreover, the integrated fuel injector load spring provides accurate control of the fuel injector load tolerance range, while accommodating tolerances of the various components of the fuel supply rail assembly as well as thermal expansion effects experienced during engine operation.

A breakaway C-shaped retainer clip 60 may be disposed between facing annular grooves 62 on the retainer sleeve 42a and the housing body 34c at each fuel injector 20 to unite the fuel injectors 20 to the other components of the fuel rail assembly 30 as an assembly for attachment to the cylinder head. Each breakaway retainer clip 60 includes a coined or other appropriately weakened region that allows the clips 60 to be broken in the event the fuel rail assembly 30 needs to be removed from the cylinder head 12 for repair or replacement while leaving the fuel injectors 20 in the cylinder head passages 13.

While the invention has been described in terms of specific embodiments thereof, it is not intended to be limited thereto but rather only as set forth in the appended claims.

What is claimed is:

1. A fuel injector system for an internal combustion engine having a cylinder head, comprising a fuel supply rail assembly having a plurality of fuel injector-receiving housings and a fuel injector load spring disposed in each fuel rail housing between said housing and said fuel injector to bias a fuel injector received within a respective one of said housings within a preselected injector load tolerance range relative to said cylinder head.

2. The system of claim 1 wherein a retainer sleeve is disposed between said spring and said fuel injector.

3. The system of claim 2 further including a load transfer collar disposed between said spring and said retainer sleeve.

4. The system of claim 3 wherein said spring and said load transfer collar are disposed about a second retainer sleeve that is disposed on said first retainer sleeve and that defines a fuel inlet between a fuel supply tube and said fuel injector.

5. A fuel injector system for an internal combustion engine having a cylinder head, comprising a fuel rail assembly having a plurality of fuel injector-receiving housings, a fuel injector disposed in each said housing, a retainer sleeve disposed in each said housing between said fuel injector and each said housing, and a fuel injector load spring disposed in each said housing between said housing and said retainer sleeve to bias said fuel injector within a preselected injector load tolerance range relative to the cylinder head.

6. A method of assembling a fuel injector on a cylinder head of an internal combustion engine, comprising positioning a fuel injector load spring and a fuel injector in a fuel injector-receiving housing of a fuel supply rail assembly with said spring disposed between said housing and said fuel injector and fastening said fuel supply rail assembly on said cylinder head, whereby said spring biases said the fuel injector within a preselected injector load tolerance range relative to said cylinder head.

7. The method of claim 6 including positioning a retainer sleeve in said housing between said spring and said fuel injector.

8. The method of claim 7 including positioning a load transfer collar between said retainer and said spring.

9. The method of claim 8 including positioning said spring and said load transfer collar about a second retainer sleeve that is disposed on said first retainer sleeve and that defines a fuel inlet between a fuel supply tube and said fuel injector.

* * * * *